COMPATIBLE SYSTEM FOR ENLARGEMENT OF PEEKABOO DATA CARD CAPACITY

Filed July 16, 1965 2 Sheets-Sheet 1

INVENTORS:
F. JONKER
WILLIAM L PARKS III
BY Homer R. Montague
ATTORNEY

May 21, 1968 F. JONKER ET AL 3,383,997

COMPATIBLE SYSTEM FOR ENLARGEMENT OF PEEKABOO DATA CARD CAPACITY

Filed July 16, 1965 2 Sheets-Sheet 2

INVENTORS:
F. JONKER
WM. PARKS III
BY Homer R. Montague
ATTORNEY

United States Patent Office 3,383,997
Patented May 21, 1968

3,383,997

COMPATIBLE SYSTEM FOR ENLARGEMENT OF PEEKABOO DATA CARD CAPACITY

Frederick Jonker, Washington, D.C., and William L. Parks III, Silver Spring, Md., assignors to Jonker Business Machines, Inc., a corporation of Delaware
Filed July 16, 1965, Ser. No. 472,740
1 Claim. (Cl. 95—73)

ABSTRACT OF THE DISCLOSURE

A method of preparing photographic records of peekaboo data matrix cards so as to expand the recording capacity by a factor of 2 or more, by successive exposures to a single photographic film of two or more original matrix cards through a mask having light-transmitting spots of reduced size at all possible matrix intersections, the mask-and-matrix-card unit and the film being relatively offset in a different direction, for each exposure, to record data spots on the film in spaces remaining amongst any previously-exposed locations adjacent each matrix intersection. The application of color film and colored spots, for easier readout discrimination is described.

*Basic principles of superimposable card systems*

This invention pertains to information retrieval systems based on the use of superimposable cards dedicated to concepts or terms and the determination of coincidence of holes in said cards. These systems are also known as superimposable card systems. Commercially they are best known as Termatrex systems.

In the Termatrex systems, an item of information is prepared for entry into the system by first indexing it by a number of terms taken from a vocabulary of terms. Each item of information is also given an accession number.

Termatrex systems comprise a number of cards each dedicated to a term of said vocabulary. In total there will generally be a vocabulary of between 500 and 5000 terms. On each term card is usually one place dedicated to each item of information in the collection and each item has the same position dedicated to it on each term card. Generally there are 10,000 dedicated positions on the term cards arranged in a matrix of 100×100 positions, but other matrices could also be used.

It is, of course, also possible to identify an item by a combination of positions on one card, and the invention will also apply to this possibility. It is also possible to identify a term by a combination of cards, and the invention will likewise apply to this possibility. In general, however, items of information are entered into a Termatrex system by selecting all of the term cards by which that item has been indexed, placing these cards in superimposition in a Termetrex machine and drilling one or more holes in all of these cards simultaneously at the position dedicated to that item of information.

The system is searched by selecting a number of term cards together describing a search question, and placing these in superimposition in a Termatrex machine. Next, a light in the bottom of the Termatrex machine is turned on, making coinciding holes in these term cards visible as light dots. The serial number of these light dots can then be read off one by one, for example, by means of a transparent grid with an X–Y coordinate system on it.

Generally, only one position is dedicated to each document. The serial number of the document could then correspond to the X–Y coordinates of that position. For example, document No. 2515 would have its position at a location with 25 as the Y coordinate and 15 as the X coordinate.

A device to enter data into superimposable cards has been disclosed in U.S. Patent No. 3,052,150. It is suited for data entry purposes as well as for search purposes as described above.

*Purpose of the invention and prior arts*

The basic limitation of systems of this nature is the capacity of the set of cards, which is 10,000 items of information for the Termatrex system.

The use of smaller holes which are more closely spaced is not practical because of the problem connected with drilling smaller holes through sizable stacks of cards.

It is possible to increase this capacity by photographic reduction, so that records of the same size can contain the images of a larger number of cards. The disadvantages are that the production of these photographic cards requires optical reduction and their readout requires optical enlargement, both of which cause great problems since freedom of distortion and accuracy of registration of superimposition are of supreme importance.

*Outline of the invention*

The invention therefore describes a method and device for increasing the capacity which does not require optical reduction and enlargement. It provides for a number of sets of original term cards to be consolidated on a single set of photographically produced cards—further to be referred to as consolidated cards—by reducing the size of the holes but not their spacing and slightly offsetting the images of original cards to be consolidated on a single card in relation to each other.

The advantages are: Nowhere is optical reduction used in the consolidation; the entire procedure is based on simple contact exposures and no expensive reader is required for the readout of the consolidated cards, which is very similar to the readout of the original cards; automatic scanning equipment now used for the original cards can, with very minor modifications, also be used for the consolidated cards.

The invention will now be described with reference to the accompanying drawings.

*Detail description of invention*

Figures 1, 2, 3, 4:
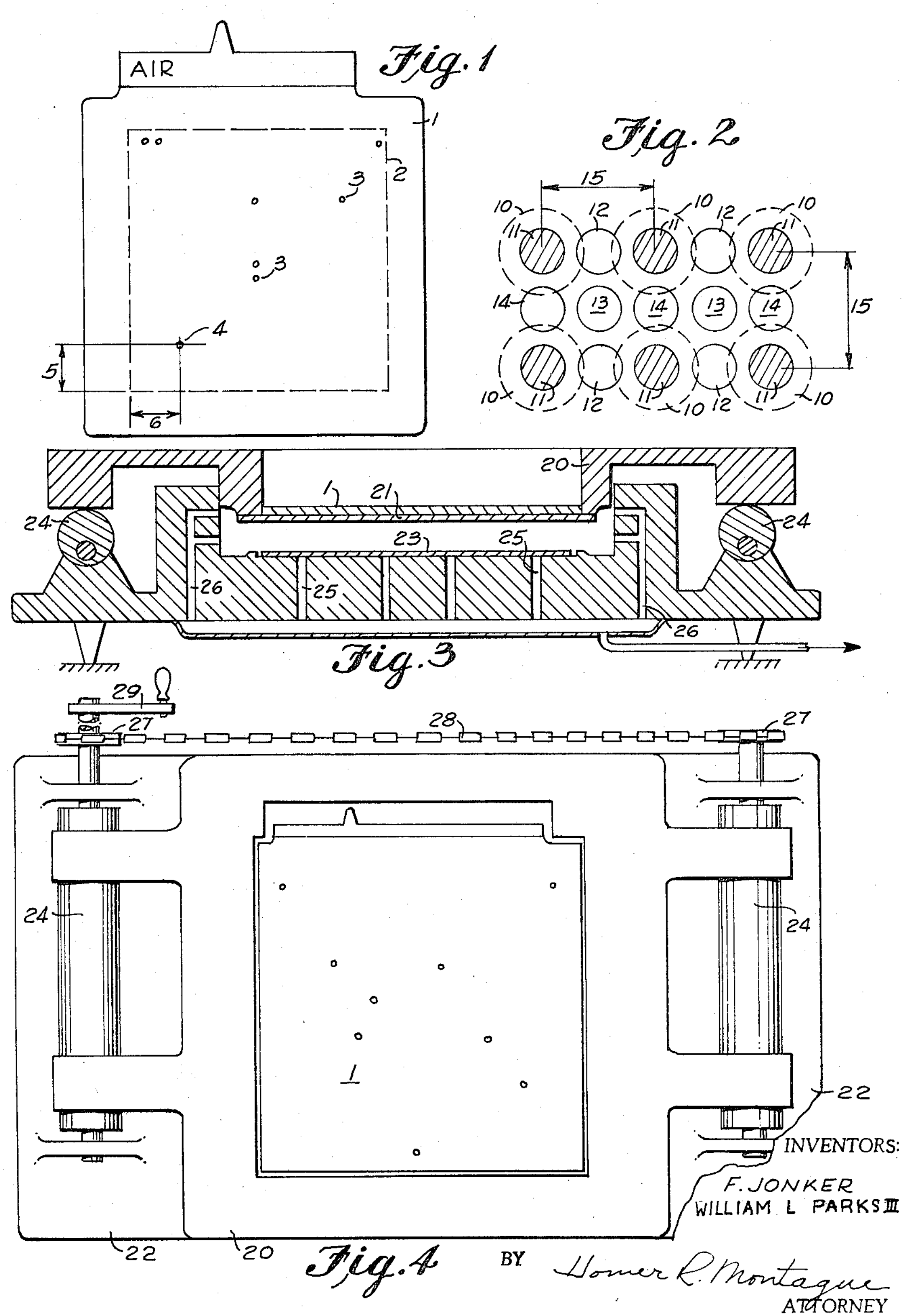
FIGURE 1 shows an example of a term card.
FIGURE 2 shows the basic principle of the consolidation.
FIGURES 3 and 4 show two views of an embodiment of the device used to make the consolidated cards.

FIGURE 1 shows an example of a term card 1. The card is dedicated to the term "air," as shown at its top. The area designated by the dashed lines 2 has been set aside for holes. Numerals 3 designate a number of such holes. The most convenient matrix of dedicated positions is the one 100×100 pattern, whereby serial numbers assigned to the holes correspond to their coordinates. For example, hole No. 4 having coordinates 5 and 6, corresponding respectively to 41 positions and 15 positions, has as its serial number 4115.

FIGURE 2 illustrates an example of the hole arrangement on a consolidated card if four different cards are consolidated into one. The consolidation is obtained by contact exposure of the first card of the term "air,"

through a mask having a hole size of about one-half that of the regular cards onto the photographic film. The regular hole size is shown in FIGURE 2 by numerals 10 in dotted lines. In FIGURE 2 it will be assumed that all matrix positions on all cards have holes. Numerals 11 show the photographic image of the first card "air" photographed through the mask with the smaller holes. Next the second card "air" is photographically exposed to the same piece of film in such a manner that images 12 of its holes fall right between the images 11 on the X axis. This is accomplished by offsetting the mask and original card in the direction of the X axis through one-half the distance of the matrix position used on the regular cards.

The images 13 of the holes of the third card are exposed onto the film in a comparable manner except that the pattern of its images has been offset in the Y axis as well as in the X axis in each direction through one-half of the distance between matrix positions of the original pattern.

The images 14 of the holes of the fourth card are offset only in the direction of the Y axis, through the same distance. In this manner 40,000 documents can be entered into the same size of cards previously used for only 10,000 documents. It is, of course, also possible to consolidate only two sets of regular cards onto a photographic card or three sets, using the same consolidation matrix of four positions.

FIGURES 3 and 4 show two views of a preferred embodiment of a device used to expose the original cards onto film. The device comprises a base frame 22 into which unexposed photographic film 23 can be placed. It is held down by suction applied through holes 25. The cards 1 to be exposed are held in a separate frame 20. Numeral No. 21 designates the mask with the matrix of 10,000 holes of reduced size. Two eccentrics 24 connected by sprocket wheels 27 and a chain 28 can either raise frame 20 or lower it onto the film 23. Frame 20 is held tightly into one of the four corners of frame 22 by means of the suction applied through tubes 26. After each exposure, the term card 1 is changed, and frame 20 is moved into a different corner by discontinuing the suction, by raising it by means of eccentrics 24, moving it over by hand into the next corner, lowering it by means of eccentric 24 and reapplying suction through tubes 26. After all four exposures have been made, the frame 20 is lifted off completely by hand to remove film 23 which is replaced by a new piece of unexposed film.

Figure 5:
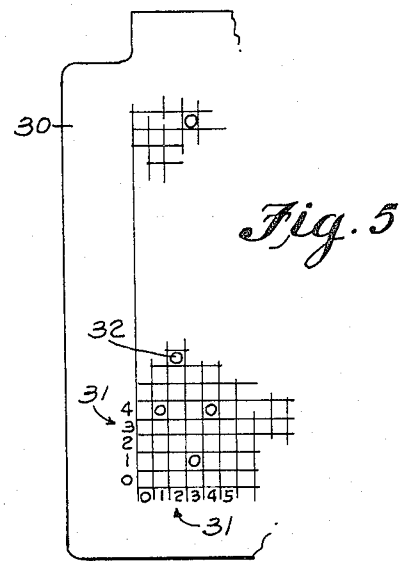
FIGURE 5 shows an example of a readout grid used.
Figure 6:
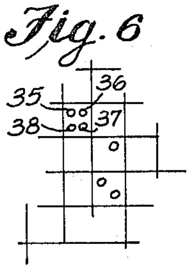
FIGURE 6 shows a detail of the readout grid.

FIGURE 5 shows a readout grid 30 commonly used with the Termatrex search systems. It is provided with lines as shown. The corridors between lines correspond to the dedicated positions and are given coordinate numbers as shown. Thus a hole normally is visible as a light dot in a box formed by lines. For example, light dot 32 would designate item 41. When reading out consolidated cards on the same lightbox and using the same grid, the light dots will, of course, appear in one-half size and can appear in any one of four positions, 35, 36, 37 or 38, within a box, as shown in FIGURE 6. In cases where the naked eye has trouble recognizing in which corner of the box a light dot appears, a magnifying glass may have to be used. For greater convenience, it is also possible to subdivide the boxes into four smaller areas, either by lines preferably of a different color or thinner than the lines designating the boxes, or by the use of four different colors. A preferred readout grid would feature four transparent spots of a different color each, in each box as shown in FIGURE 6.

One advantage of this system is that any equipment developed for automatic scanning of regular term cards can also be adapted for the scanning of the consolidated cards. Of course, four different scans will have to be made and a mask based on the smaller hole size will have to be used.

Figure 7:
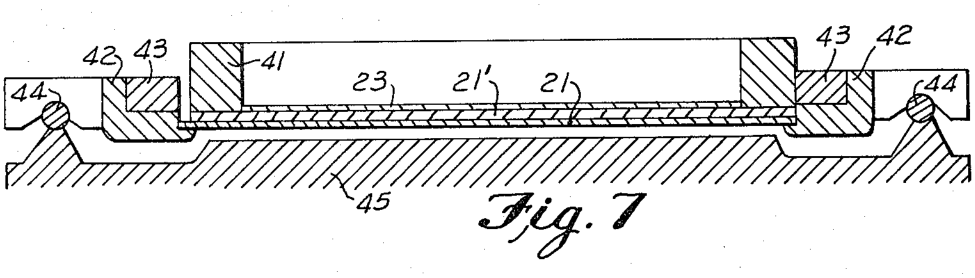
FIGURE 7 shows a cross section of an adaptor for readout by an automatic scanner.

FIGURE 7 schematically indicates an adaptor 41 for such an automatic scanning device. The scanner could feature a tray 42 sliding on two rods 44 over a scanning head 45. The tray 42 has a mask 21 based on the small hole size. In it fits an adaptor 41, also having a mask 21′ based on the small hole size. On it is placed a consolidated card 23. Magnets 43 help retain the adaptor in either of the four corners of the tray 42. The lateral spacing between adaptor and card tray in X direction as well as Y direction is, of course, equal again to one-half the spacing between holes on the regular cards. To scan consolidated cards four scan movement will be required, each time with the card adaptor in a different corner. The adaptor can, of course, be pushed over by hand or an automatic mechanism for this can be devised.

Card scanners of this nature are well known in the art. Co-pending application No. 353,557, dated Mar. 20, 1964, describes such a device.

Figure 8:
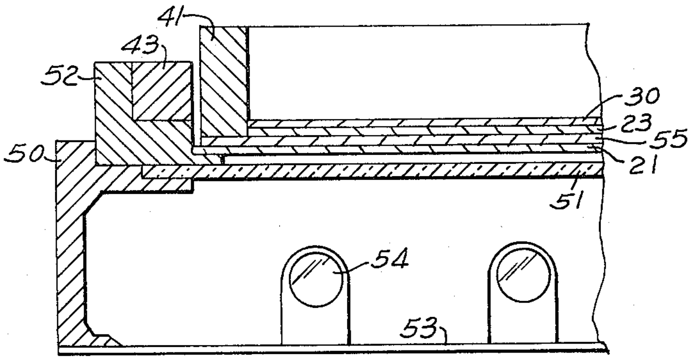
FIGURE 8 shows a cross section of an adaptor for visual readout on a lightbox.

Instead of using the readout grid shown in FIGURE 6 where the naked eye has to distinguish between the four different types of holes, a device based on the same mask of the reduced hole size can be used. It is shown in FIGURE 8, and it comprises a lightbox 50 with a removable bottom 53 on which fluorescent lights 54 are mounted. A translucent plastic plate 51 acts as a diffusor.

Tray 52 connected to lightbox 50 features magnets 43 and mask 21. The adaptor is again similar to the adaptor of FIGURE 7. In it is placed one or more consolidated term cards and on top of these, the readout grid 30. Thus each time the adaptor is pushed over into a different corner, a different readout is obtained. Numeral 55 could be a thin transparent plate or a mask 21 etched in metal.

Instead of numbering the documents from 1 through 40,000, it is convenient to designate documents by a number between 0 and 10,000 and a color. The four sets of original cards can each be given a different color and the same color can be used to divide the boxes shown in FIGURE 6 into sections of four different colors. The four corners of the adaptor shown in FIGURES 7 and 8 can likewise be marked by colors.

A simplification of the device can be used for exposing as well as reading. If in FIGURE 3 the mask 21 is dispensed with and the film 23 is thinner than the depression in frame 22 in which it fits, frame 20 can slide back and forth and left and right, without scratching film 23. The arms of the frame 20 and the rollers 24 upon which they rest are then no longer needed. However, the mask will now fit removably inside frame 20, and every time the frame 20 is moved, the mask will have to be removed and put back in place to prevent scratching of the film 23.

It is, of course, not necessary to use a hole pattern of 100×100. In fact, any desired pattern or coordinate system can be used. Also the consolidation need not necessarily use round holes, instead squares or oblongs can be used. Instead of using four index positions corresponding to four corners of a square as a consolidation matrix, it is, in principle, possible to use any number of index positions along the X axis as well as along the Y axis.

Instead of utilizing the invention to consolidate a multiple set of cards of the same collection, it is also possible to put several different collections on the same card. In that case many of the cards will have different terms assigned to them. They should be marked on the cards in different colors corresponding to the colors used for the original cards and on the readout grid.

The foregoing specification describes only one preferred method of employing the invention and one preferred embodiment of the devices involved. The invention is not limited to these. Its full scope is described by the claims.

What we claim is:

1. The method of consolidating, on a single photographic record, the data carried by several opaque data cards of the type having transparent data spots formed at selected intersections in a regularly-spaced matrix array, and in which cards the spot size approaches the value of the spacing between successive rows and columns of the matrix, said method comprising the steps of:

(a) providing a mask of opaque material having light-transmitting spots arranged at all intersections in a matrix array corresponding to said data cards, said spots being of a size which is less than half the value of the row and column spacing of said data cards, (b) superposing said mask and a first data card in matrix registration with respect to one another, (c) exposing a photographically sensitive record medium to light passing through said superposed elements, to record thereon the data carried by said first data card, by means of data spots of reduced size (and thereby of increased edge-to-edge spacing) relative to said first data card, and (d) repeating steps (b) and (c) with the same mask and record medium, but with one or more successively different ones of such data cards, and with the record medium and the superposed mask-data-card assembly relatively offset during each successive exposure, to record data spots in the enlarged spaces remaining amongst the previously-exposed locations on said record medium.

References Cited

UNITED STATES PATENTS

| | | | |
|---|---|---|---|
| 61,139 | 1/1867 | Barbour | 95—36 |
| 1,000,323 | 8/1911 | Butler | 95—36 X |
| 2,943,533 | 7/1960 | Goodbar | 95—37 X |
| 3,267,826 | 8/1966 | Browning | 95—37 X |

FOREIGN PATENTS

| | | |
|---|---|---|
| 644,518 | 6/1928 | France. |
| 72,737 | 6/1916 | Switzerland. |

JOHN M. HORAN, *Primary Examiner.*